US012306958B2

(12) United States Patent
Palanki et al.

(10) Patent No.: US 12,306,958 B2
(45) Date of Patent: May 20, 2025

(54) SECURE APPLICATION DEVELOPMENT USING DISTRIBUTED LEDGERS

(71) Applicant: American Express Travel Related Services Company, Inc., New York, NY (US)

(72) Inventors: Hiranmayi Palanki, Tampa, FL (US); Upendra Sharadchandra Mardikar, Fremont, CA (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 18/316,878

(22) Filed: May 12, 2023

(65) Prior Publication Data

US 2023/0281321 A1 Sep. 7, 2023

Related U.S. Application Data

(63) Continuation of application No. 16/850,384, filed on Apr. 16, 2020, now Pat. No. 11,687,656.

(51) Int. Cl.
*G06F 21/00* (2013.01)
*G06F 8/77* (2018.01)
(Continued)

(52) U.S. Cl.
CPC .............. *G06F 21/577* (2013.01); *G06F 8/77* (2013.01); *G06F 16/27* (2019.01); *H04L 9/0825* (2013.01); *G06F 2221/033* (2013.01)

(58) Field of Classification Search
CPC .......... H04L 12/40013; H04L 63/1425; H04L 63/1441; H04L 12/40; H04L 2012/40273;
(Continued)

(56) References Cited

U.S. PATENT DOCUMENTS

| 10,181,948 B1 | 1/2019 | Nenov et al. |
| 11,243,763 B2 | 2/2022 | Periaswamy |

(Continued)

FOREIGN PATENT DOCUMENTS

| KR | 1020140084217 | 7/2014 |
| KR | 1020190081299 | 7/2019 |
| WO | 2018064154 A1 | 4/2018 |

*Primary Examiner* — Tri M Tran
(74) *Attorney, Agent, or Firm* — Thomas Horstemeyer, LLP

(57) ABSTRACT

Disclosed are various systems and methods for using distributed ledgers to assist in securely developing applications. One such method comprises requesting a validation service to determine if an application component is permitted to be deployed within a software application, wherein a use indicator is provided with the request to the validation service and indicates how the application component is being used within the software application; receiving a response from the validation service confirming that an endorsed application component record exists for the application component in a distributed ledger, wherein the response indicates that a degree or type of security risk that usage of the application component can introduce to the software application complies with a security policy for inclusion of application components in the software application; and responsive to receiving the response from the validation service, deploying the application component in the software application.

20 Claims, 4 Drawing Sheets

(51) Int. Cl.
*G06F 16/27* (2019.01)
*G06F 21/57* (2013.01)
*H04L 9/08* (2006.01)

(58) Field of Classification Search
CPC ......... H04L 2012/40215; G06F 21/566; G06F 2221/034
See application file for complete search history.

(56) References Cited

U.S. PATENT DOCUMENTS

| | | |
|---|---|---|
| 2015/0370874 A1 | 12/2015 | Bansal et al. |
| 2018/0189732 A1 | 7/2018 | Kozloski et al. |
| 2018/0239897 A1 | 8/2018 | Ventura |
| 2019/0065709 A1* | 2/2019 | Salomon ............... H04L 9/0643 |
| 2019/0305959 A1* | 10/2019 | Reddy ....................... G06F 8/73 |
| 2020/0334032 A1* | 10/2020 | Smith ...................... G06F 21/64 |
| 2020/0394309 A1 | 12/2020 | Angelo et al. |

* cited by examiner

SECURE APPLICATION DEVELOPMENT USING DISTRIBUTED LEDGERS

CROSS-REFERENCE TO RELATED APPLICATION

This application is a continuation of co-pending U.S. utility application entitled, "Secure Application Development Using Distributed Ledgers," having Ser. No. 16/850,384, filed Apr. 16, 2020, which is entirely incorporated herein by reference.

BACKGROUND

Modern software applications are often complex and rely on libraries, modules, or plug-ins to provide additional functionality or to implement commonly used functionality. For example, a library might be included in an application to perform common file operations. Some libraries might be authored by first-parties (e.g., other developers on a team or other teams within the same organization or enterprise). Other libraries might be authored by third-parties. Moreover, libraries authored by one entity might use or rely on additional libraries provided by other entities. So a first-party library could contain third-party libraries, while a third-party library could contain fourth-party, fifth-party, sixth-party, etc. libraries, modules, or plug-ins.

However, the inclusion of third-party libraries within an application creates an opportunity for introducing security vulnerabilities into the code base. For example, an attacker might compromise a popular third-party library in order to insert a security vulnerability into all applications that make use of the third-party library. Likewise, an attacker could compromise fourth- or fifth-party libraries that are ultimately utilized by the third-party library to hide security vulnerabilities from security auditors.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for securing the development and deployment of applications. Application components, such as software libraries, modules, or plug-ins, can be sent to a verifying entity. The verifying entity can evaluate the submitted component to determine the degree or type of security risk, if any, that usage of the component might introduce into an application. The verifying entity can also determine whether the submitted component complies with one or more policies. The result can then be saved to a distributed data store, such as a distributed ledger or a blockchain.

Subsequently, a developer can seek permission to use the submitted component in an application. The verifying entity can search the distributed data store and return a response indicating whether the submitted component is permitted to be used. As a result, malicious software components can be prevented from being added to the application. This minimizes the possibility that an attacker might compromise a third-party, fourth-party, or fifth-party supplied component in order to introduce an exploitable vulnerability into the application.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
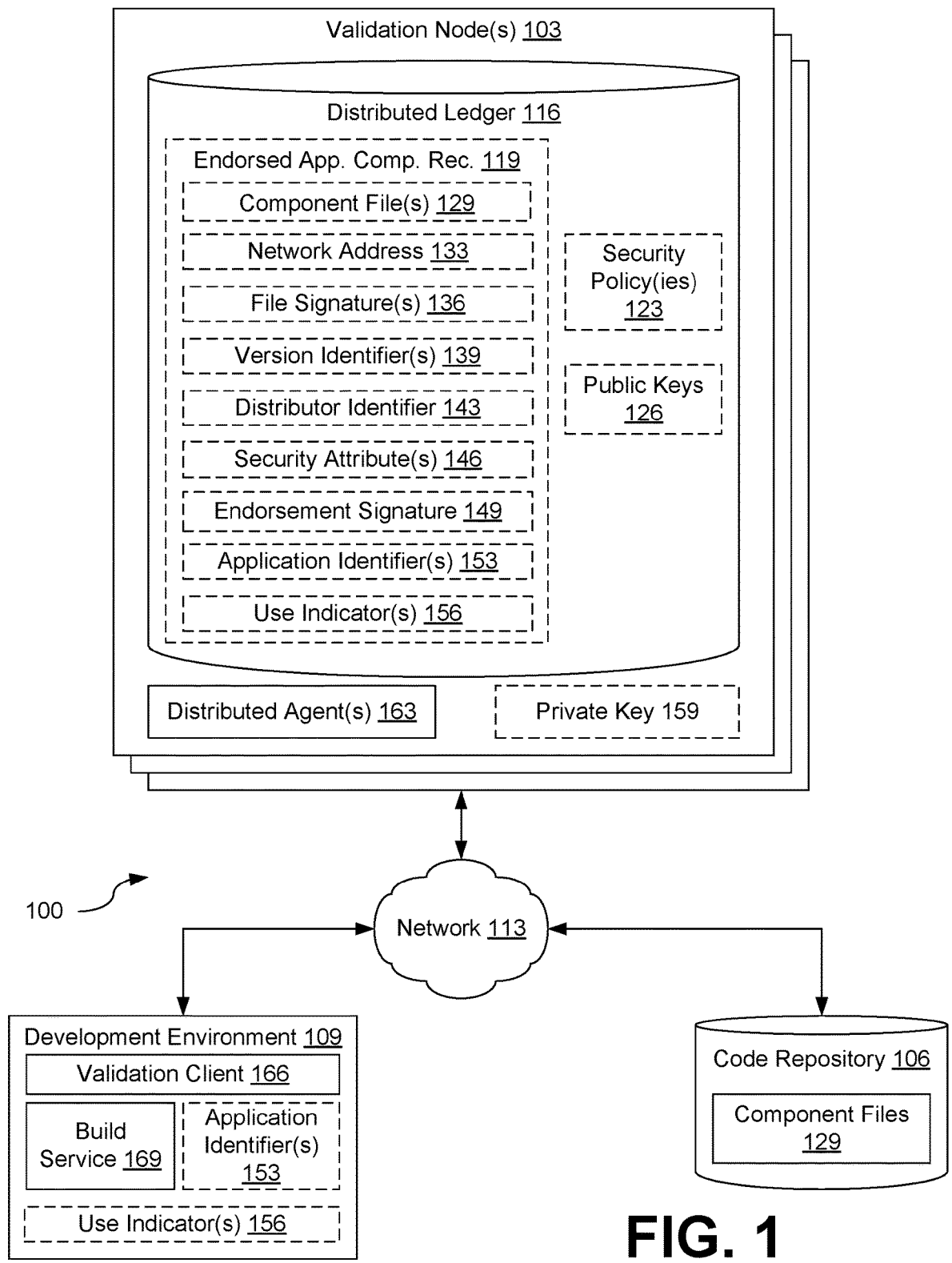
FIG. 1 is a drawing of a network environment according to various embodiments of the present disclosure.

FIG. 1 depicts a network environment 100 according to various embodiments. The network environment 100 can include one or more validation nodes 103, a code repository 106, and a development environment 109, which can be in data communication with each other via a network 113.

The network 113 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

Individual validation nodes 103 can represent individual computing devices that include a processor and a memory. Individual validation nodes 103 can have one or more applications stored in the memory that, when executed by the processor, cause the validation node 103 to perform various actions. Likewise, various types of data can also be stored in the memory of a validation node 103. Some data may be stored in a distributed ledger 116, a local copy of which may be stored in the memory of the validation node 103.

The distributed ledger 116 can represent a synchronized, eventually consistent, data store spread across multiple nodes in different geographic or network locations. Each validation node 103 participating in the distributed ledger 116 can contain a replicated copy of the distributed ledger 116, including all data stored in the distributed ledger 116. Records of transactions involving the distributed ledger 116 can be shared or replicated using a peer-to-peer network connecting the individual members (e.g., validation nodes 103) that form the distributed ledger 116. Once a transaction or record is written to the distributed ledger 116, it can be replicated across the peer-to-peer network until the transaction or record is eventually stored with all members. Various consensus methods can be used to ensure that data is written reliably to the distributed ledger 116. In some implementations, once data is written to the distributed ledger 116, such data is immutable. In such instances, updates to immutable data would be written as a new entry to the distributed ledger 116 that references the prior entry and indicates the prior entry as being stale or out of date. Examples of a distributed ledger 116 can include blockchains, distributed hash tables (DHTs), and similar data structures. Data stored in the distributed ledger 116 can include one or more endorsed application component records 119, one or more security policies 123, and one or more public keys 126.

An endorsed application component record 119 can represent an application component that has been analyzed or reviewed by one or more validation nodes 103. Upon review, the application component can be approved for future use, in which case a record of it can be saved in the distributed ledger 116 as an endorsed application component record 119. Accordingly, the endorsed application component record 119 can include information about one or more component files 129 that form the application component or a network address 133 for the code repository 106 from which the component files 129 can be obtained. Some implementations may include copies of the component files 129 within the record for the endorsed application component record 119, while other implementations may include the network address 133 pointing to the code repository 106 in order to minimize the amount of space used by an endorsed application record 119. The endorsed application component record 119 can also include one or more file signatures 136, one or more version identifiers 139, a distributor identifier 143, one or more security attributes 146, an endorsement signature 149, one or more application identifiers 153, and one or more use indicators 156.

A component file 129 can be any file that would be integrated into an application. A component file 129 can be a binary file comprising machine-readable instructions executable by a processor of a computing device or a human readable source code file. In those implementations where the component file 129 is a human readable source code file, the component file 129 may be written in a language that uses an interpreter to convert the human readable source code into an executable binary form at runtime (e.g., JAVASCRIPT®, PYTHON®, etc.). The component file 129 may represent a library, plug-in, or module that provides functionality for an application. In some implementations where the library, plug-in, or module is large and includes multiple component files 129, then each component file 129 may be included in the endorsed application component record 119.

The network address 133 can represent the network location of the code repository 106 where component files 129 may be stored or obtained. Examples of network addresses 133 include internet protocol (IP) addresses, such as IP version 4 (IPv4) or IP version 6 (IPv6), strings of characters that unambiguously and uniquely identifies a particular resource (e.g., a uniform resource indicator (URI)).

The file signature 136 can represent the cryptographic signature of a respective component file 129 generated by a public key 126 of a validation node 103 or the cryptographic hash of the respective component file 129 generated using a cryptographic hash algorithm (e.g., message digest 5 (md5), secure hash algorithm 1 (SHA-1), one of the secure hash algorithm 2 (SHA-2) algorithms, the secure hash algorithm 3 (SHA-3), etc.). The file signature 136 can be generated when the endorsed application component record 119 is stored in the distributed ledger 116 to verify whether subsequently analyzed component files 129 match those stored as a part of the endorsed application component record 119.

The version identifier 139 represents any identifier used to uniquely identify the application component with respect to other applications components, and thereby uniquely identify one version of the endorsed application component record 119 with respect to another version of the endorsed application component record 119. For example, each component file 129 could have a respective version identifier 139, allowing for changes between individual component files 129 to be tracked. As another example, a collection of component files 129 could share a version identifier 139, such that an update in any of the component files 129 would be reflected by an updated version identifier 139.

Distributor identifier 143 represents any identifier that can be used to uniquely identify the creator, author, or distributor of the component file(s) 129 for the application component. In some instances, the distributor identifier 143 could take the form of the name of the creator, author, or distributor. In other instances, cryptographic certificate (e.g., a code-signing certificate) could be used as the distributor identifier 143.

Security attribute(s) 146 can represent known information about the security posture of the component files 129. For example, a security attribute 146 could identify the use of unvalidated or unverified sub-libraries or subcomponents provided by additional parties. As another example, a security attribute 146 could identify a known security flaw or vulnerability for component files 129 associated with a particular version identifier 139. A security attribute 146 could also specify that insecure methods or functions were used (e.g., functions or methods that do not provide boundary checking and are subject to possible buffer-overflows, functions or methods that could allow for code injection attacks, etc.), or that sub-library or subcomponent has a known security vulnerability.

An endorsement signature 149 represents a cryptographic signature generated by a private key 159 of a validation node 103. The endorsement signature 149 can be used to verify or validate to other devices or applications that the endorsed application component record 119 is authentic.

One or more application identifiers 153 may be stored in association with the endorsed application component record 119. Examples of application identifiers 153 include application names, unique identifiers assigned to applications, cryptographic certificates or signatures used to uniquely identify an application binary, etc. Individual application identifiers 153 can be used in some implementations to identify individual applications which are permitted to use the component files 129. This might be done in a situation where the component files 129 have known security risks, as indicated by one or more security attributes 146, but are permitted to be used in specific, low-risk situations or applications.

One or more use indicators 156 can be stored in associated with the endorsed application component record 119. The use indicators 156 can represent any code, tag, symbol, or other identifier that indicates a permissible use of the component files 129 in the endorsed application component record 119. Use indicators 156 may be used to control how a component file 129 would be used or the types of applications that the component file 129 could be included in. For example, a use indicator 156 could represent that component files 129 may only be included in applications that do not process personally identifying information because the component files 129 include dependencies on unverified fourth, fifth, or sixth-party code. As another example, a use indicator 156 could indicate that the component files 129 could be included in applications that process confidential information because the component files 129 are part of first-party library that was developed in-house.

A security policy 123 can represent a policy regarding the circumstances in which component files 129 can be permitted for inclusion in an application (e.g., endorsed by a validation node 103). Multiple security policies 123 may be present for evaluation by a validation node 103. For example, some security policies 123 may only be applicable to particular types of component files 129 (e.g., third-party libraries, plug-ins, modules, etc.), while other security policies 123 may be applicable to all component files 129 generally.

A public key 126 for the validation node 103 may be stored in the distributed ledger 116 to make it easily and publicly available to other validation nodes 103, the development environment 109, etc. The public key 126 can be used by the development environment 109 or other validation nodes 103 to verify file signatures 136, the endorsement signature 149, or perform similar cryptographic operations.

A respective private key 159 can be stored on the validation node 103, but separate from the distributed ledger 116. The private key 159 can be used to generate file signatures 136, the endorsement signature 149, or perform similar cryptographic operations.

Various applications can also be executed by the validation nodes 103. For example, a validation node 103 could host and execute a distributed agent 163. The distributed agent 163 can represent a script or other executable which can be executed by individual validation nodes 103 hosting the distributed ledger 116. When a computation is performed by the distributed agent 163, each validation node 103 can perform the computation and compare its result with the results computed by other validation nodes 103. When a sufficient number of validation nodes 103 agree on the result of the computation, the result can be stored in the distributed ledger 116 (e.g., as the endorsed application component record 119 or portion of the endorsed application component record 119) or provided to the computing device that invoked the distributed agent 163 (e.g., a computing device within the development environment 109). An example of a distributed agent 163 is a "smart contract" used in the ETHEREUM platform, although other distributed ledger or blockchain-based technologies provide similar functionality.

For instance, a distributed agent 163 could be programmed to create and provide access to endorsed application component records 119. Upon receipt of one or more component files 129, the distributed agent 163 could evaluate the component files 129 to determine whether they comply with one or more security policies 123. If the component files 129 comply with at least one security policy 123, the distributed agent 163 could create and store a respective endorsed application component record 119 in the distributed ledger 116. Subsequently, when the development environment 109 requests permission to use one or more component files 129, the distributed agent 163 could provide a response approving or denying the request based on the presence or absence of an endorsed application component record 119 or the content of the endorsed application component record 119. Additional detail about the specific operations of the distributed agent 163 is provided later.

A code repository 106 accessible to the validation nodes 103 and the development environment 109 can also be connected to the network 113. The code repository 106 can serve as a data store that maintains and provides access to component files 129. Such a data store can be representative of a plurality of data stores, which can include relational databases or non-relational databases such as object-oriented databases, hierarchical databases, hash tables or similar key-value data stores, as well as other data storage applications or data structures. The code repository 106 can also provide version control, access control, and other functionality.

The development environment 109 is representative of one or more computing devices used to create and deploy applications. A development environment 109 can scale from a single software developer's personal computer to a cluster of computing devices spread out across several locations in data communication with each other through the network 113. Applications that may be executed within the development environment 109 include a validation client 166 and a build service 169. In addition, various data may be stored within the development environment 109, such as application identifiers 153 for applications developed within or by the development environment 109.

The validation client 166 can be executed by the development environment 109 to communicate with the validation nodes 103. For instance, the validation client 166 may be executed to search the distributed ledger 116 for one or more endorsed application communication records 119 that match a particular criterion or criteria. Alternatively, the validation client 166 could retrieve and store a copy of the distributed ledger 116 locally within the development environment 109 to increase the speed of searching the distributed ledger 116. As another example, the validation client 166 could provide an application component (e.g., a library, module, plug-in, etc.), including any relevant component files 129, to a distributed agent 163 for validation or verification of compliance with one or more applicable security policies 123.

The build service 169 represents any application or service that can generate, create, or compile an application from multiple binary or human-readable components. This could include source-code files, binary files, etc. Examples of build services 169 include compilers, automated or continuous build services (e.g., the JENKINS automation service), and similar applications.

Although the validation client 166 and the build service 169 are separately discussed and depicted as separate applications, in some implementations, the functionality of these applications be a provided by combined application. For example, the functionality of the validation client 166 could be included in the build service 169.

Next, a general description of the operation of the various components of the network environment 100 is provided. Although the following description is an example of how the various components of the network environment 200 may interact with each other, other interactions are also possible. A more detailed description of the operation of individual components is provided in the description accompanying FIGS. 2-4.

To begin, the validation client 166 can request that a validation node 103 analyze an application component (e.g., a library, module, plug-in, etc.). The request could be initiated by the build service 169 (e.g., in response to identifying that a new or updated version of a library has been added to an application), or manually requested (e.g., by a developer). As part of the request, the validation client 166 could provide copies of the component files 129 or a network address 133 that identifies the code repository 106 where the component files 129 reside. The validation client 166 may also provide the version identifier 139, distributor identifier 143, and/or security attributes 146. For example, the validation client 166 may have obtained the version identifier 139 and distributor identifier 143 from the code repository 106. As another example, a software developer may have provided this information to the validation client 166. The validation client 166 may have done an initial analysis of the component files 129 to identify one or more security attributes 146. As another example, the validation client 166 may receive one or more security attributes 146 as inputs from a software developer (e.g., because the software developer is aware of a potential security issue with the component files 129).

The validation node 103 can then verify that the component files 129 received from the validation client 166 comply with one or more security policies 123. For instance, the validation node 103 can supply the component files 129 or the network address 133 where the component files 129 can be obtained to a distributed agent 163. The validation node 103 can also supply any version identifiers, distributor identifiers 143, or security attributes 146 that were provided by the validation client 166. The distributed agent 163 can then obtain the component files 129 from the code repository, if needed, and the analyze the component files 129 for compliance with one or more security policies 123.

Assuming that the component file(s) 129 comply with one or more security policies 123, the distributed agent 163 can create an endorsed application component records 119 and save it to the distributed ledger 116. For example, the distributed agent 163 can add the component files 129 and/or network address 133 to the endorsed application component record 119. The distributed agent 163 could also add the version identifier 139, the distributor identifier 143, and security attributes 146, if available. In some implementations, the distributed agent 163 could also determine which applications or use cases the component files 129 are authorized for use, according to one or more security policies 123. In these implementations, the distributed agent 163 could add application identifiers 153 and/or use indicators 156 to the endorsed application component record 119. Finally, the distributed agent 163 could generate file signatures 136 for individual component files 129 and an endorsement signature 149 for the endorsed application component record 119. The endorsed application component record 119 could then be saved to the distributed ledger 116.

Subsequently, the build service 169 may attempt to use one or more component files 129 (e.g., by linking a library to an application, inserting a script into a web page, deploying a web page that includes a script, etc.). Prior to creation (e.g., compilation) or deployment (e.g., sending a web-page containing client-side executable script to a web server) of the application, the build service 169 may send a request to the validation client 166 to determine whether the component files 129 are permitted to be included in or deployed with the application. For example, the build service 169 may provide an identifier of the component file 129 (e.g., a file name or hash, and a version identifier 139) or a copy of the component file 129 itself. As another example, the build service 169 could provide the network address 133 where the component file can be found (e.g., a Uniform Resource Locator (URL) for the component files 129 in a code repository 106) and potentially additional information (e.g., version identifiers 139, file names, etc.). In some implementations, the build service 169 could also provide an application identifier 153 for an application that will use the component files 129 or a use indicator 156 indicating how the component files 129 will be used within an application.

In response, the validation client 166 can determine whether an endorsed application component record 119 exists for the specified component files 129. If an endorsed application component record 119 exists, the validation client 166 may respond to the build service 169 indicating that the component files 129 can be used. However, if the build service 169 provided an application identifier 153 or a use indicator 156, the validation client 166 could also evaluate whether the endorsed application component record 119 indicates that the component files 129 can be used within the specified application for the specified purpose. In some implementations, the validation client 166 can search the distributed ledger 116 stored by the validation nodes 103. In other implementations, the validation client 166 can search a locally stored or cached copy of the distributed ledger 116. Once the build service 169 has received approval from the validation client 166 (e.g., in the form of an indication that an appropriate endorsed application component record 119 is present in the distributed ledger 116), the build service 169 can the integrate or deploy the component files 129 along into the respective application.

Figure 2:
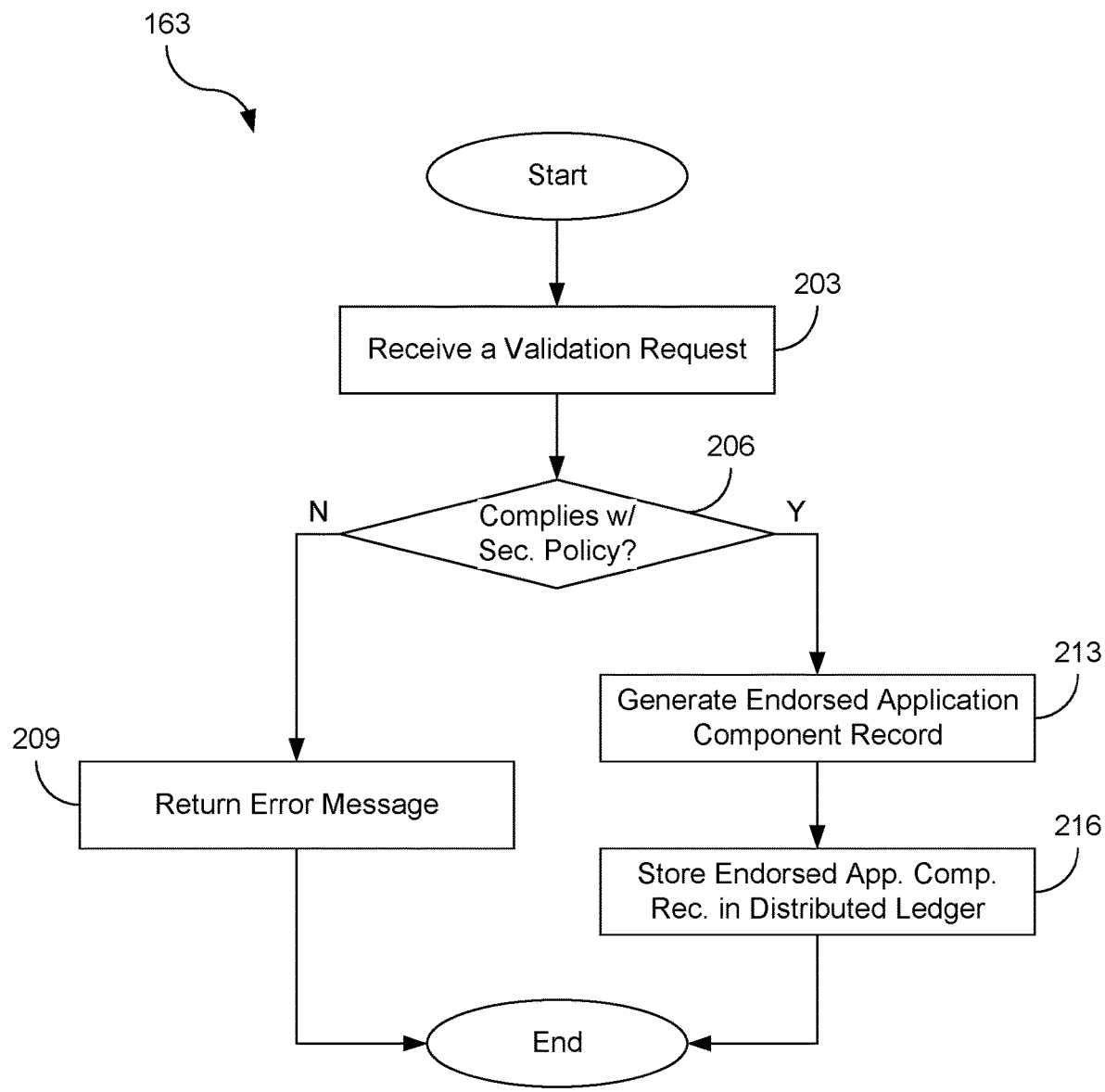
FIG. 2 is a flowchart illustrating one example of functionality implemented as portions of an application executed in a computing environment in the network environment of FIG. 1 according to various embodiments of the present disclosure.

Referring next to FIG. 2, shown is a flowchart that provides one example of the operation of a portion of the distributed agent 163. The flowchart of FIG. 2 provides merely an example of the many different types of functional arrangements that can be employed to implement the operation of the depicted portion of the distributed agent 163. As an alternative, the flowchart of FIG. 2 can be viewed as depicting an example of elements of a method implemented within the network environment 100.

Beginning with block 203, the distributed agent 163 can receive a validation request from a validation client 166. The validation request can represent a request to confirm, verify, or validate compliance of an application component with specified or predefined security policies 123. The validation request can include various information needed validate, verify, or otherwise confirm compliance of the component files 129 with one or more security policies 123. For example, the validation request could include a copy of the component files 129 themselves. As an alternative, the validation request could include a network address 133 for the code repository 106 where the component files 129 reside. The validation request could also include one or more security attributes 146 associated with component file(s) 129, a distributor identifier 143 associated with the component file(s) 129, etc.

Then at block 206, the distributed agent 163 can determine whether the component file(s) 129 of the application component comply with an applicable security policy 123. If the component file(s) 129 fail to comply with the security policy 123, the process proceeds to block 209. If the component file(s) 129 comply with the security policy 123, the process proceeds to block 213. Whether the component file(s) 129 comply with the security policy 123 can be determined according to various criteria or combinations of criteria.

For example, the distributed agent 163 could evaluate whether any of the security attributes 146 associated with the component file(s) 129 are listed as prohibited by the security policy 123. As another example, the distributed agent 163 could determine whether the network address 133 or distributor identifier 143 associated with the component file(s) 129 were prohibited by the security policy 123.

In another example, if a security attribute 146 indicated that the component file(s) 129 included code from additional sources (e.g., first-party code containing third-party code, third-party code containing fourth-party code, etc.) which were not approved, then the distributed agent 163 could determine that the component file(s) 129 failed to comply with the security policy 123. Likewise, if the additional sources were approved, then the distributed agent 163 could determine that the component file(s) 129 comply with the security policy 123.

In a similar example, if a security attribute 146 indicated that the component file(s) 129 used particular methods, functions, libraries, etc., that the security policy 123 prohibited (e.g., because of known security vulnerabilities or risks), then the distributed agent 163 could determine that the component file(s) 129 violated the security policy 123. Likewise, if the version identifier 139 for the component file(s) 129 were specified as prohibited by the security policy 123 (e.g., because the version has a known security vulnerability), then the distributed agent 163 could determine that the component file(s) fail to comply with the security policy 123.

As another example, the distributed agent 163 could determine whether the distributor identifier 143 is included in an approved list of distributors specified by the security policy 123 or is included in a prohibited list of distributors specified by the security policy 123. If the distributor is unapproved or prohibited, then distributed agent 163 could determine that the component file(s) 129 fail to comply with the security policy 123. Likewise, if the distributor is approved or not prohibited, then the distributed agent 163 could determine that the component file(s) 129 comply with the security policy 123.

In some instances, compliance may be determined on a conditional basis. For example, a security policy 123 might specify that component file(s) 129 with particular security attributes 146 can be used in limited situations, by particular applications, or particular types of applications. In these examples, the distributed agent 163 could determine that the component file(s) 129 comply with the security policy 123, but specify particular application identifiers 153 or use indicators 156 to be included in an endorsed application component record 119.

If the process proceeds to block 209, the distributed agent 163 can return an error message to the validation client 166. The error message may include additional information about why the component file(s) 129 fail to comply with the security policy 123. For example, the error message may specify which security attributes 146 cause the component file(s) 129 to fail to comply with the security policy 123. Once the error message is returned, then the process ends.

However, if the process proceeds to block 213, the distributed agent 163 can generate an endorsed application component record 119. For example, the distributed agent 163 can add the component files 129 and/or network address 133 to the endorsed application component record 119. The distributed agent 163 could also add the version identifier 139, the distributor identifier 143, and security attributes 146, if available. Finally, the distributed agent 163 could generate file signatures 136 for individual component files 129 and an endorsement signature 149 for the endorsed application component record 119. If compliance was conditional, the distributed agent 163 could also add information about the conditions. For example, the distributed agent 163 could application identifiers 153 or use indicators 156 to the endorsed application component record 119 to specify the limited circumstances in which the component file(s) 129 is/are authorized to be used.

Then at block 216, the distributed agent 163 can store the endorsed application component record 119 to the distributed ledger 116. Once stored in the distributed ledger 116, the endorsed application component record 119 becomes immutable and propagates to the copies of the distributed ledger 116 hosted by other validation nodes 103.

Figure 3:
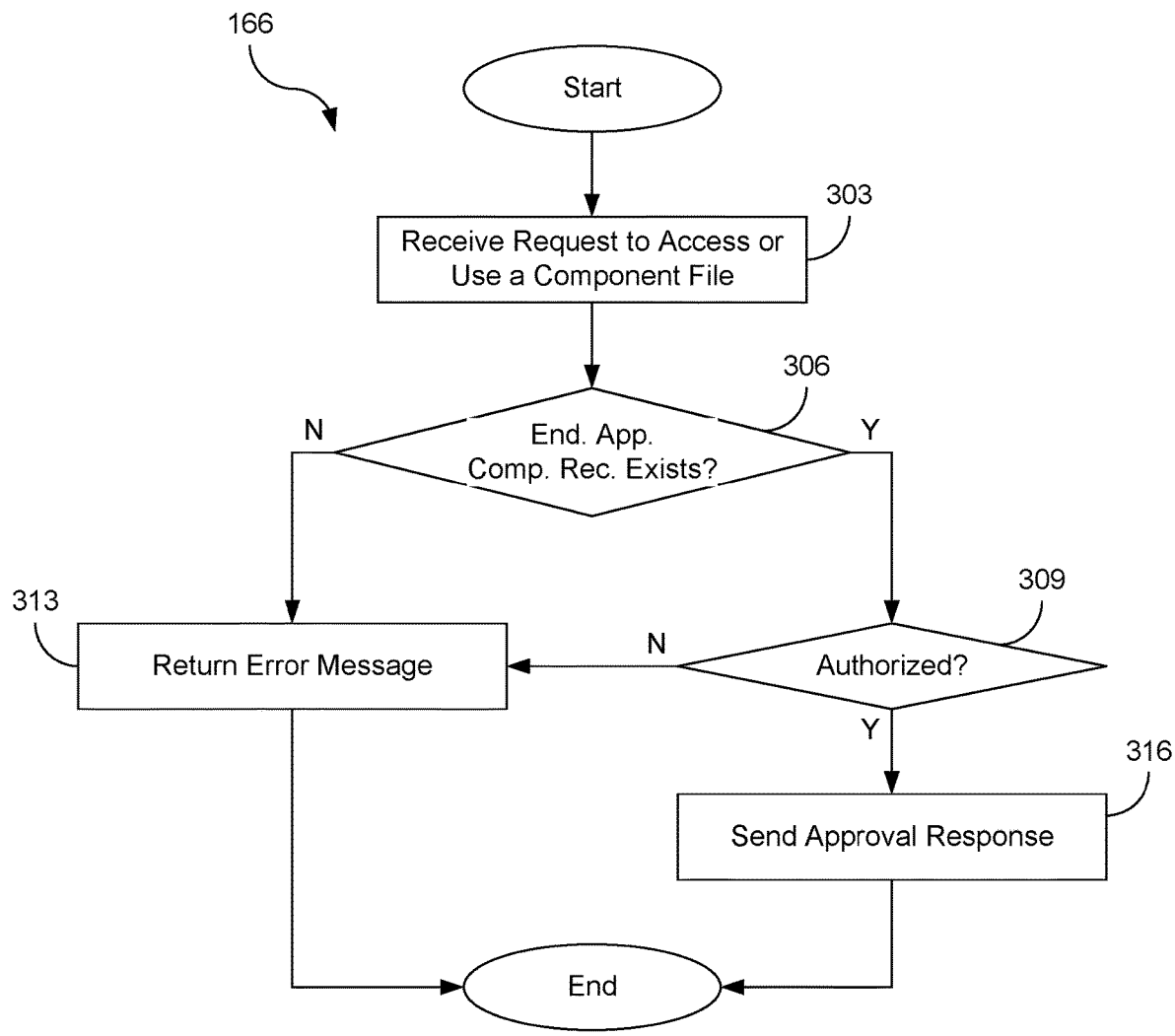
FIG. 3 is a flowchart illustrating one example of functionality implemented as portions of an application executed in a computing environment in the network environment of FIG. 1 according to various embodiments of the present disclosure.

Referring next to FIG. 3, shown is a flowchart that provides one example of the operation of a portion of the validation client 166. The flowchart of FIG. 3 provides merely an example of the many different types of functional arrangements that can be employed to implement the operation of the depicted portion of the validation client 166. As an alternative, the flowchart of FIG. 3 can be viewed as depicting an example of elements of a method implemented within the network environment 100.

Beginning with block 303, the validation client 166 can receive a request to access or use a component file 129 (e.g., as part of a request to use a library, module, plug-in, etc.). The request can be received, for instance, from a build service 169 that is building or deploying an application and is attempting to add the component file 129 to the application. The request can include an identifier of the component file 129, the component file 129 itself, and/or a network address 133 where the component file 129 can be obtained, as well as potentially other information. The request could also include an application identifier 153 to indicate the particular application or type of application that the component file 129 would be used with. Similarly, the request cloud also include a use indicator 156 to indicate how the component file 129 would be used within an application assembled by the build service 169.

Beginning with block 306, the validation client 166 can determine whether an endorsed application component record 119 for the component file 129 exists in the distributed ledger. For example, the validation client 166 may search the distributed ledger 116 for an endorsed application component record 119 that includes a matching component file 129 or reference to the matching component file 129. Similarly, the validation client 166 could search the distributed ledger 116 for an endorsed application component record 119 that includes a matching network address 133. If a respective endorsed application component record 119 exists in the distributed ledger 116, then the process proceeds to block 309. If no respective endorsed application component record 119 exists in the distributed ledger 116, then the process can proceed to block 313.

Beginning with block 309, the validation client 166 can optionally determine whether or not the component file 129 is authorized for use by the build service 169. In some implementations, the existence of an endorsed application component record 119 can indicate that any application would be authorized to use the component file(s) 129 represented by the record 119. In other instances, the validation client 166 could compare the application identifiers 153 or use indicators 156 stored in the endorsed application component record 119 with the application identifiers 153 or use indicators 156 provided by the build service 169. If the application identifiers 153 or use indicators 156 match, then use of the component file(s) 129 can be considered authorized. Accordingly, the process would proceed to block 316. Otherwise, the use of the component file(s) 129 would be considered unauthorized, and the process would proceed to block 313.

If the process proceeds to block 313, the validation client 166 may return an error message to the build service 169.

The error message can indicate that use of the component file(s) 129 identified in the request at block 303 is unauthorized or not permitted. In some instances, the error message may also specify details or reasons why the use of the component file(s) 129 is unauthorized.

However, if the process proceeds to block 316, the validation client 166 can send a response indicating that use of the component file(s) is approved. In some implementations, this can include the validation client 166 sending a copy of the endorsed application component record 119 to the build service 169 for authentication or verification by the build service 169.

Figure 4:
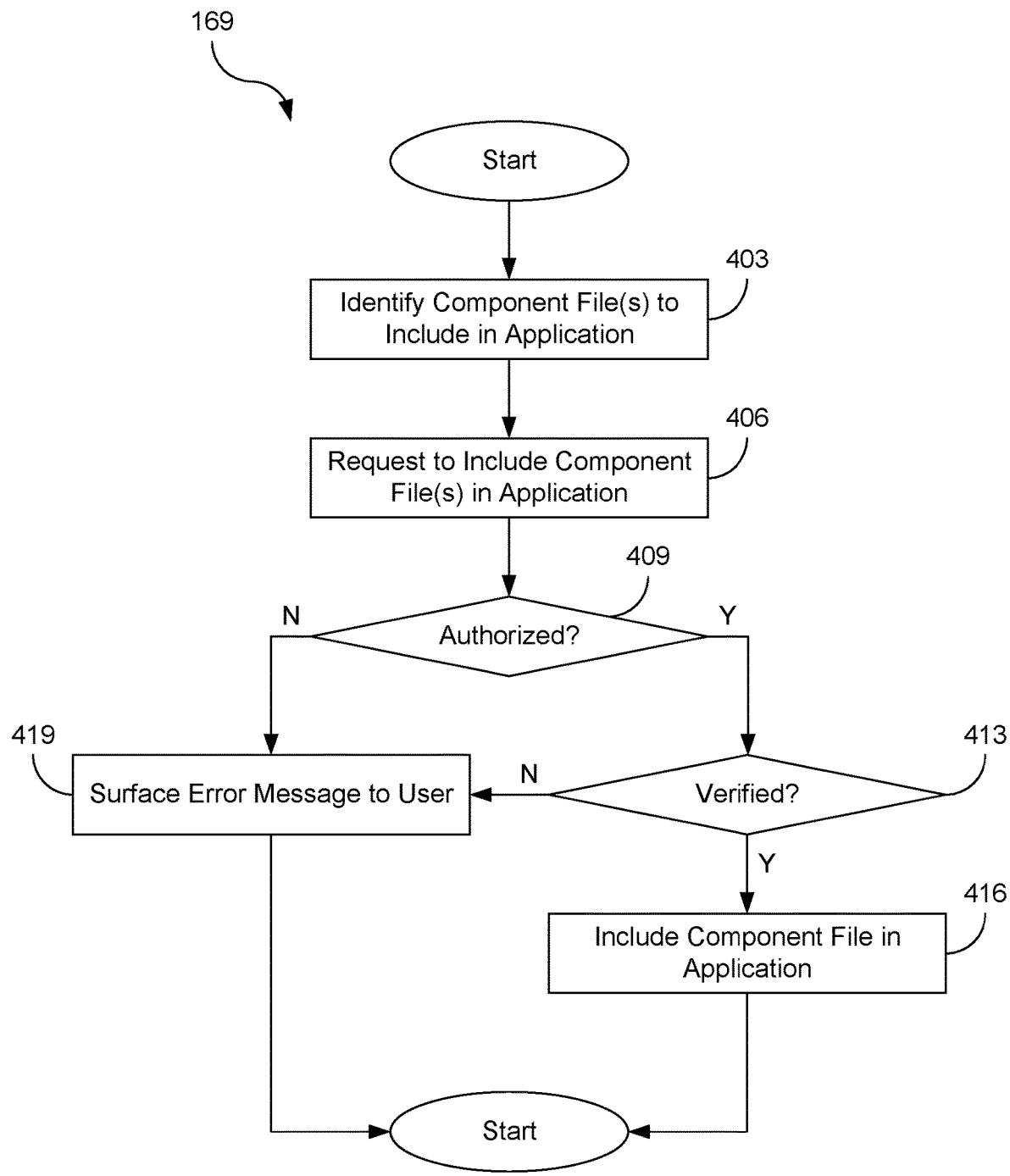
FIG. 4 is a flowchart illustrating one example of functionality implemented as portions of an application executed in a computing environment in the network environment of FIG. 1 according to various embodiments of the present disclosure.

Referring next to FIG. 4, shown is a flowchart that provides one example of the operation of a portion of the build service 169. The flowchart of FIG. 4 provides merely an example of the many different types of functional arrangements that can be employed to implement the operation of the depicted portion of the build service 169. As an alternative, the flowchart of FIG. 4 can be viewed as depicting an example of elements of a method implemented within the network environment 100.

Beginning with block 403, the build service 169 can identify one or more component files 129 to include in an application being assembled, compiled, or otherwise built by the build service 169. In some implementations, the build service 169 may identify individual component files 129 within a codebase or source code tree (e.g., because they have been indicated as external components, dependencies, libraries, etc.). In other implementations, the build service 169 may identify component files 129 during the assembly or compilation process (e.g., while resolving dependencies).

Then at block 406, the build service 169 can send a request to the validation client 166 for permission to include the identified component files 129 in the application. The request can include the identity of the component file 129 or the component file 129 itself, a network address 133 where the component file 129 may be obtained, the version identifier 139, the distributor identifier 143, one or more security attributes 146, one or more application identifiers 153, one or more use indicators 156, and/or additional information as previously described.

Moving on to block 409, the build service 169 can receive a response from the validation client 166. The response can either indicate that use of the component file 129 is authorized or that use is prohibited. In these instances, the response may also include a copy of the endorsed application component record 119 for the respective component file 129. If the use is authorized, the process can proceed to block 413. If the use is prohibited, then the process can proceed to block 419.

Proceeding to block 413, the build service 169 may verify the endorsed application component record 119 for the respective component files 129. For example, the build service 169 could use the endorsement signature 149 to verify the identity of the endorsed application component record 119. As another example, the build service 169 could use the file signatures 136 to verify that the component file(s) 129 being used are the same as the ones that were verified or validated by a distributed agent 163 executing on a validation node 103. For instance, the build service 169 could determine that the public key 126 is trusted by the validation client 166 specifically or the development environment 109 generally (e.g., because the public key 126 is stored in a key store of the development environment 109). The build service 169 could then use the public key 126 to verify or validate the endorsement signature 149 or file signatures 136. If the endorsed application component record 119 or components files 129 cannot be verified, then the process can skip to block 419. Otherwise, the process can proceed to block 416.

Then at block 416, the build service 169 can include or otherwise integrate the component file(s) 129 into the application that is being assembled and/or deployed by the build service 169. In some implementations, this may simply mean that compilation or assembly will proceed as originally intended. In these cases, a copy of the component file(s) 129 may already be included in the codebase for the application. In other implementations, the build service 169 could retrieve and add or otherwise integrate the component file(s) into the application. For instance, the build service 169 could retrieve copies of the component file(s) 129 from the code repository 106 using the network address 133 for the component file(s) 129. As another example, the build service 169 could insert the network address 133 into the application (e.g., as a reference to an executable script to be downloaded and executed by a web page when it is requested by a browser). Once the component file(s) 129 are included, the process can end.

However, at block 419, the build service 169 could surface an error message to an end user (e.g., a software developer) that the component file(s) 129 could not be included in the application. For example, the build service 169 could write an error message to a log, send an email to the user, or cause a message to be displayed within a user interface of an application executing on the user's computing device (e.g., an error message rendered within an integrated development environment (IDE)). The error message could include the reasons why the component file(s) 129 were considered to be unauthorized for use at block 409 or could not be verified at block 413. Once the error message is surfaced to the user, the process can end.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system comprising:
   a computing device comprising a hardware processor and a memory; and
   machine-readable instructions stored in the memory that, when executed by the hardware processor, cause the computing device to at least:
   request a validation service to determine if an application component is permitted to be deployed within a software application,
   wherein a use indicator that indicates a permissible use of the application component is provided with the request to the validation service and indicates how the application component is being used within the software application;

receive a response from the validation service confirming that an endorsed application component record exists for the application component in a distributed ledger, wherein the response indicates that a degree or type of security risk that usage of the application component can introduce to the software application complies with a security policy for inclusion of application components in the software application; and responsive to receiving the response from the validation service, deploy the application component in the software application.

2. The system of claim 1, wherein the security policy is a distributed agent executable by participants in the distributed ledger, and the machine-readable instructions that cause the computing device to determine that the application component complies with the security policy further cause the computing device to at least:

provide the application component as an input to the security policy; and evaluate an output of the security policy to determine that the application component complies with the security policy.

3. The system of claim 1, wherein:

the application component comprises at least one of a security attribute for the application component or a version identifier of the application component; and the determination that the application component complies with the security policy is further based at least in part on at least one of a distributor identifier, a security attribute, or a version identifier.

4. The system of claim 3, wherein the security attribute for the application component identifies a potential security vulnerability within the application component.

5. The system of claim 1, wherein the use indicator specifies a condition on use of the application component.

6. The system of claim 1, wherein the use indicator specifies a type of application that can use the application component.

7. The system of claim 1, wherein the application component comprises human-readable code executable by an interpreter.

8. A method comprising:

requesting a validation service to determine if an application component is permitted to be deployed within a software application, wherein a use indicator that indicates a permissible use of the application component is provided with the request to the validation service and indicates how the application component is being used within the software application;

receiving a response from the validation service confirming that an endorsed application component record exists for the application component in a distributed ledger, wherein the response indicates that a degree or type of security risk that usage of the application component can introduce to the software application complies with a security policy for inclusion of application components in the software application; and responsive to receiving the response from the validation service, deploying the application component in the software application.

9. The method of claim 8, wherein a copy of the application component is stored in the distributed ledger and the method further comprises sending a copy of the application component stored in the distributed ledger in the response indicating that access to the application component is approved.

10. The method of claim 8, wherein the distributed ledger represents a data store that is replicated across computing nodes in a peer-to-peer network.

11. The method of claim 8, wherein the request to access the application component comprises an identifier for the application component and determining that the endorsed application component record exists in the distributed ledger further comprises searching the distributed ledger for an entry in the distributed ledger that comprises the identifier for the application component.

12. The method of claim 8, further comprising evaluating the endorsed application component record to determine that the application component is authorized for the indicated use by matching the use indicator in the request with an indicator in a list of approved uses included in the endorsed application component record.

13. The method of claim 8, wherein the request comprises an application identifier, and the method further comprises determining that the application identifier matches a respective application identifier include in a list of approved software applications in the endorsed application component record.

14. A system comprising a computing device comprising a hardware processor and a memory; and machine-readable instructions stored in the memory that, when executed by the hardware processor, cause the computing device to at least:

request a validation service to determine if an application component is permitted to be deployed within a software application, wherein a use indicator a use indicator that indicates a permissible use of the application component is provided with the request to the validation service and indicates how the application component is being used within the software application;

receive a response from the validation service confirming that an endorsed application component record exists for the application component in a distributed ledger, wherein the response indicates that a degree or type of security risk that usage of the application component can introduce to the software application complies with a security policy for inclusion of application components in the software application; and responsive to receiving the response from the validation service, deploy the application component in the software application.

15. The system of claim 14, wherein the response specifies an asymmetric encryption key used to sign the response, and the machine-readable instructions further cause the computing device to at least:

determine that the asymmetric encryption key is trusted by the computing device;

determine that the response has a valid signature generated by the asymmetric encryption key; and integrate the application component with the software application in response to a determination that the asymmetric encryption key is trusted by the computing device and that the response has the valid signature.

16. The system of claim 14, wherein the endorsed application component record comprises a network address at which the application component is obtainable, wherein the machine-readable instructions further cause the computing device to at least:
- obtain the application component from a code repository located at the network address; and
- integrate the application component into the software application.

17. The system of claim 14, wherein the request further comprises an application identifier for the software application in which the application component will be included.

18. The system of claim 14, wherein the request indicates how the application component will be used by the software application.

19. The system of claim 14, wherein the software application comprises a web page and the application component comprises an executable script that will be inserted into the web page.

20. The system of claim 14, wherein:
- the application component comprises at least one of a security attribute for the application component or a version identifier of the application component, wherein the security attribute for the application component identifies a potential security vulnerability within the application component.

* * * * *